Figure 1:
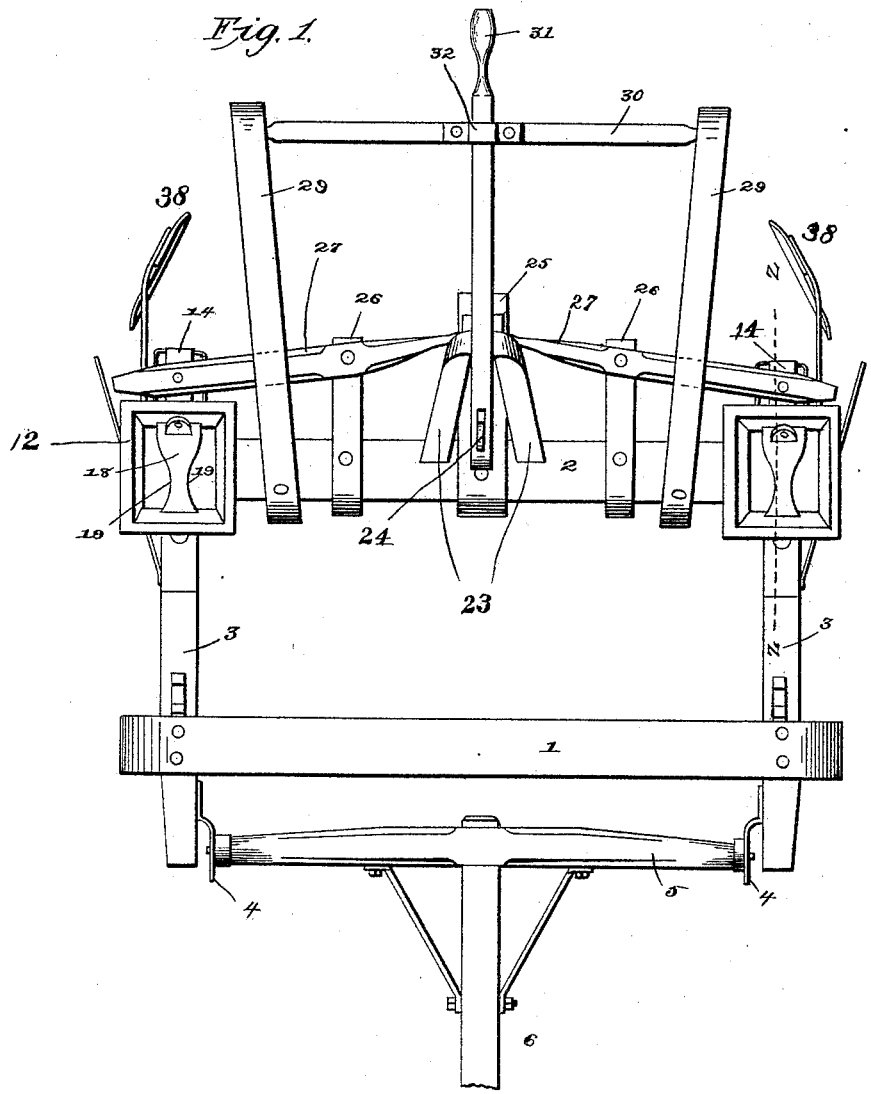

(No Model.) 2 Sheets—Sheet 1.

H. BUSH.
CORN PLANTER.

No. 460,248. Patented Sept. 29, 1891.

Witnesses:
James Donnan
Wm. Bagger

Inventor.
Henry Bush
by Knowles
Attorneys (No Model.) 2 Sheets—Sheet 2.
H. BUSH.
CORN PLANTER.
No. 460,248. Patented Sept. 29, 1891.
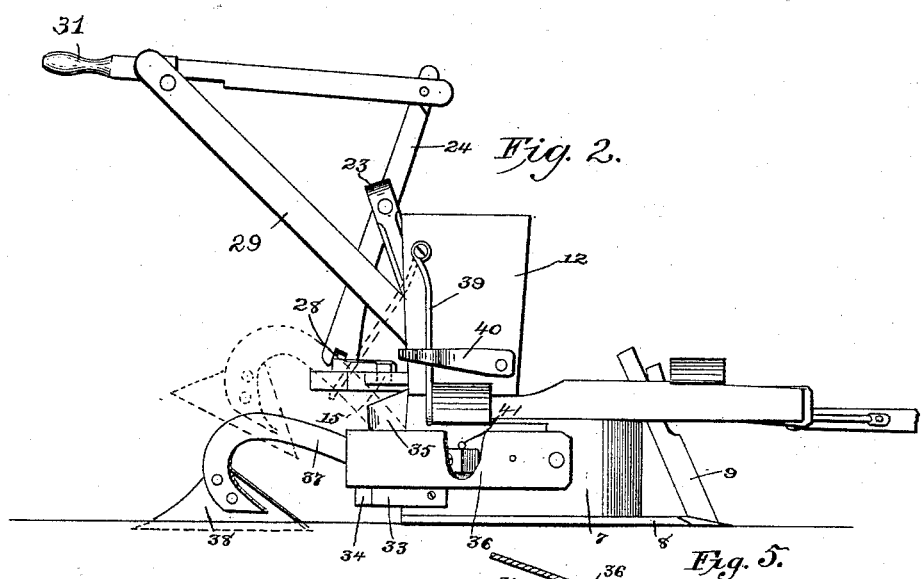
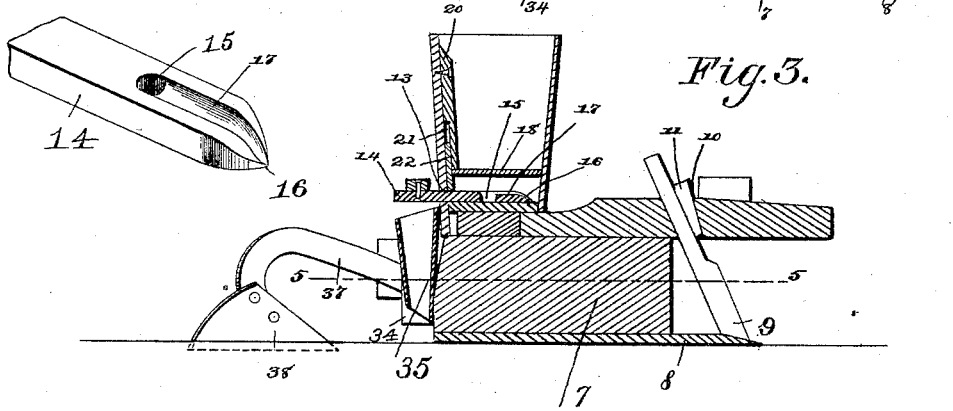

United States Patent Office.

HENRY BUSH, OF HOLGATE, OHIO.

CORN-PLANTER.

SPECIFICATION forming part of Letters Patent No. 460,248, dated September 29, 1891.

Application filed April 11, 1891. Serial No. 388,602. (No model.)

*To all whom it may concern:*

Be it known that I, HENRY BUSH, a citizen of the United States, residing at Holgate, in the county of Henry and State of Ohio, have invented a new and useful Corn-Planter, of which the following is a specification.

This invention relates to corn-planters; and it has for its object to provide a device of this class which shall be simple in construction and efficient in operation, and in which the seed-dropping mechanism shall be controlled by the operator who may thus deposit the seeds accurately at the points desired.

With these ends in view the invention consists of the improved construction, arrangement, and combination of parts which will be hereinafter fully described, and particularly pointed out in the claims.

In the drawings hereto annexed, Figure 1 is a plan view of a corn-planter constructed in accordance with my invention. Fig. 2 is a side elevation of the same. Fig. 3 is a vertical sectional view taken longitudinally through one of the seed-boxes and runners or furrow-openers. Fig. 4 is a perspective detail view of one of the seed-slides. Fig. 5 is a horizontal sectional view taken on the line 5 5 in Fig. 3.

Like numerals of reference indicate like parts in all the figures.

The frame of my improved corn-planter is composed of the front and rear cross-bars 1 and 2 and the side bars 3 3, which are suitably connected to form a rectangular frame. The side bars 3 3 are provided at their front ends with clips 4, between which is pivotally mounted a draft-bar 5, from which the tongue 6 extends forwardly, as shown. To the under sides of the side bars 3 3 are secured the runners or furrow-openers 7, the under sides of which have sharp-pointed shoes 8. The latter, which are extended some distance in front of the runners, are provided with sockets for the reception of the lower ends of the inclined knives or cutters 9, the upper ends or shanks of which extend through slots 10 in the side bars of the frame and are secured by means of wedges 11. These knives serve to cut the soil in advance of the runners, which latter will thus serve to open the furrows for the reception of the seed.

The seed-boxes 12 are suitably mounted upon the rear cross-bar 2 of the frame directly above the runners or furrow-openers. The rear sides of the seed-boxes are provided with slots 13 for the passage of the seed-slides 14. The latter are provided with perforations 15, forming the seed-cups, and the front ends of said seed-slides are pointed, as shown at 16, and provided with grooves 17, leading to the perforations or seed-cups. By this construction the seed-slides may be readily pushed forward into the seed-boxes, and the contents of the latter will be guided by the grooves 17 to the openings of seed-cups 15. Each of the seed-boxes is provided at a short distance above the seed-slide with a cross-bar or partition 18, having recessed sides 19. These cross-bars will prevent the contents of the seed-boxes from packing around the slides in such a manner as to interfere with the operation of the latter. Suitably secured to the rear walls of the seed-boxes are the vertically-arranged plates or blocks 20, the rear sides of which have recesses 21, in which the vertically-sliding cut-off plates 22 are mounted. Said cut-off plates rest upon the upper sides of the seed-slides and serve to remove superfluous seed from the openings of seed-cups of the latter.

The rear or main cross-bar 2 of the frame is provided with upwardly-extending and rearwardly-inclined braces 23, between which is pivoted a lever 24. The said rear cross-bar of the frame is also provided with rearwardly-extending arms or brackets 25 26 26. To the brackets 26 are pivoted levers 27, the outer ends of which are suitably connected with the seed-slides 14. The inner ends of the lever 27 engage a slot or recess 28 in the lower end of the lever 24, by means of which they may thus be simultaneously operated, the inner ends of said levers 27 being supported upon the bracket 25, whereby they are prevented from being accidentally disengaged from the slot 28 in the lever 24. The cross-bar 2 of the frame is also provided with rearwardly-inclined arms or brackets 29, connected by a cross-bar 30, supporting the operating bar or handle 31, the front end of which is pivotally connected with the upper end of the lever 24. A clip 32 is provided to guide the handle 31 upon the cross-bar 30. It will be seen that by means of said handle the operator, who walks behind the machine, may readily operate the seed-slides and control the seed-dropping mechanism.

The runners or furrow-openers are provided with rearwardly-extending guards 33 and 34, between which are mounted the seed-tubes 35, by means of which the seed is conducted to the ground. The outer sides of said runners are also provided with fenders 36, between which and the runners are pivoted the beams 37, having the coverers 38. Suitably pivoted to the sides of the seed-boxes are hooks 39, which, when not in use, may be held in position by means of spring-catches 40. Lugs or studs 41 are provided to sustain the beams 37 in operative position. When the machine is to be carried from one field to another, or when for any other reason it shall be desired to throw the coverers out of operation, the beams 37 may be supported upon the hooks 39, as will be seen in dotted lines in Fig. 2 of the drawings.

From the foregoing description, taken in connection with the drawings hereto annexed, the operation and advantages of my invention will be readily understood. The machine is dragged over the field, and the operator, who walks behind the machine, may, by simply manipulating the handle 31, operate the seed-slides so as to drop the seeds at the desired points.

The construction of the machine is simple and inexpensive, and it may be easily and successfully operated.

Having thus described my invention, I claim and desire to secure by Letters Patent of the United States—

1. In a corn-planter, the combination of the frame, the elongated and pointed runners or furrow-openers secured to the under sides of the side bars of said frame and depending therefrom, the flat sharp-pointed shoes secured to the under sides of and extending in front of said runners, and the inclined knives or cutters seated in the front edged ends of said shoes and extending through slots in the side bars of the frame and secured in said slots by means of keys or wedges, substantially as set forth.

2. In a corn-planter, the combination of the frame, the elongated and pointed runners having horizontal rearwardly-extending parallel guards and outwardly-extending fenders, the seed-tubes secured between the horizontal parallel guards at the rear ends of the runners, the seed-boxes having the longitudinally-movable pointed and perforated seed-slides extending through the rear sides of said boxes, and the levers by means of which said seed-slides may be simultaneously operated, substantially as set forth.

3. In a corn-planter, the combination, with the seed-boxes, of the longitudinally-movable slides extending through the rear walls of said boxes and having tapered pointed front ends, vertical perforations or seed-cups, and longitudinal grooves extending from said perforations to the points, substantially as and for the purpose set forth.

4. The combination of the seed-boxes having cross-bars provided with recessed sides, the longitudinally-reciprocating seed-slides extending through the rear walls of the seed-boxes and having vertical perforations or seed-cups, the plates or blocks secured in the seed-boxes to the rear walls of the latter and having recesses in their inner sides registering and communicating with the recessed ends of said cross-bars, and the vertical cut-off plates mounted slidingly in said recesses, substantially as and for the purpose set forth.

5. The combination of the frame, the seed-boxes, the longitudinally-reciprocating seed-slides extending through the rear walls of the seed-boxes, the inclined brackets 23, the lever 24, having recess 28, the brackets 26, the levers 27, pivoted to the latter and connecting the seed-slides with the lower end of the lever 24, the inclined arms 29, the connecting-bar 30, and the operating-handle 31, connected pivotally with the upper end of the lever 24 and resting upon the cross-bar 30, all arranged and operating substantially as and for the purpose set forth.

6. The combination of the frame, the furrow-openers, the seed-boxes, the longitudinally-movable seed-slides, means, substantially as described, for operating the latter, the fenders secured to the outer sides of the furrow-openers, the coverers mounted pivotally between said fenders and furrow-openers, depending hooks pivoted to the outer sides of the seed-boxes and adapted to support the coverer-beams, spring-catches to retain said hooks, and stop lugs or pins adapted to engage the inner ends of said beams and hold the same in an operative position, substantially as set forth.

In testimony that I claim the foregoing as my own I have hereto affixed my signature in presence of two witnesses.

HENRY BUSH.

Witnesses:
JOHN SELL,
GUY C. DITTENHAVER.